United States Patent
Nakajima

(10) Patent No.: US 6,798,179 B2
(45) Date of Patent: Sep. 28, 2004

(54) STABILIZED DIRECT-CURRENT POWER SUPPLY DEVICE

(75) Inventor: Akio Nakajima, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/348,174

(22) Filed: Jan. 22, 2003

(65) Prior Publication Data

US 2003/0137854 A1 Jul. 24, 2003

(30) Foreign Application Priority Data

Jan. 22, 2002 (JP) ........................................ 2002-012932

(51) Int. Cl.[7] .............................................. G05F 1/573
(52) U.S. Cl. ...................... 323/277; 323/274; 323/275; 323/901
(58) Field of Search ................................. 323/901, 908, 323/268, 273–277, 280, 281

(56) References Cited

U.S. PATENT DOCUMENTS 4,346,342 A * 8/1982 Carollo ....................... 323/276

6,198,258 B1 * 3/2001 Ando et al. ................. 323/222

FOREIGN PATENT DOCUMENTS

| JP | 6-250747 A | 9/1994 |
| JP | 2000-56843 A | 2/2000 |
| JP | 2001-84044 A | 3/2001 |

* cited by examiner

*Primary Examiner*—Michael Sherry
*Assistant Examiner*—Gary L. Laxton
(74) *Attorney, Agent, or Firm*—Birch, Stewart, Kolasch & Birch, LLP

(57) ABSTRACT

In a conventional stabilized direct-current power supply device with a soft starting function, soft starting is achieved by exploiting the rise in a reference voltage. Thus, soft starting is impossible when the reference voltage has already risen. A stabilized direct-current power supply device of the invention has a current suppression circuit that, when the output voltage rises, suppresses the current output from a voltage conversion circuit that converts the input voltage into the output voltage to be fed out. Thus, soft starting is possible even when the reference voltage has already risen.

15 Claims, 6 Drawing Sheets

US 6,798,179 B2

STABILIZED DIRECT-CURRENT POWER SUPPLY DEVICE

BACKGROUND OF THE INVENTION

1. Field of the Invention

The present invention relates to a stabilized direct-current power supply device such as a series regulator or switching regulator. More particularly, the present invention relates to soft starting of a stabilized direct-current power supply device.

2. Description of the Prior Art

FIG. 5 shows an example of the configuration of a conventional stabilized direct-current power supply device. The stabilized direct-current power supply device of FIG. 5 is composed of an input terminal 1, an output terminal 2, a ground terminal 3, an error amplifier 4, a reference voltage circuit 5, a control terminal 6, a PNP-type transistor Q1, an NPN-type transistor Q2, and resistors R1 to R3. All these circuit elements are integrated into a semiconductor integrated circuit device.

First, the configuration of the stabilized direct-current power supply device of FIG. 5 will be described. The input terminal 1 is connected to the emitter of the transistor Q1. The collector of the transistor Q1 is connected to one end of the resistor R1 and to the output terminal 2. The other end of the resistor R1 is connected through the resistor R2 to the ground terminal 3. The node between the resistors R1 and R2 is connected to the inverting input terminal of the error amplifier 4, and the output end of the reference voltage circuit 5 is connected to the non-inverting input terminal of the error amplifier 4. The output terminal of the error amplifier 4 is connected to the base of the transistor Q2. The collector of the transistor Q2 is connected to the base of the transistor Q1, and the emitter of the transistor Q2 is connected through the resistor R3 to the ground terminal 3. The first supply power input terminal of the reference voltage circuit 5 is connected to the input terminal 1, and the second supply power input terminal of the reference voltage circuit 5 is connected to the ground terminal 3. The control terminal 6 is connected to the error amplifier 4. The output terminal 2 and the ground terminal 3 are connected to a capacitor Co and a load RL provided outside the semiconductor integrated circuit device.

Next, the operation of the stabilized direct-current power supply device of FIG. 5 will be described. The transistor Q1 converts an input voltage Vin fed in via the input terminal 1 into an output voltage Vo, and feeds the output voltage Vo to the output terminal 2. The resistors R1 and R2 constitute an output voltage detection circuit, which divides the output voltage Vo and delivers a divided voltage Vadj to the inverting input terminal of the error amplifier 4. On the other hand, the reference voltage circuit 5, operating on the input voltage Vin, produces a reference voltage Vref on the basis of the band-gap voltage, and feeds the reference voltage Vref to the no-inverting input terminal of the error amplifier 4.

The error amplifier 4 amplifies the difference between the reference voltage Vref and the divided voltage Vadj, and outputs the amplified difference to the base of the transistor Q2. The transistor Q2 amplifies the signal output from the error amplifier 4 and feeds it to the base of the transistor Q1 in order to control the collector-emitter voltage of the transistor Q1. Moreover, by controlling a voltage applied to the control terminal 6, the output of the error amplifier 4 is turned on and off.

As the amplified error signal output from the error amplifier 4 to the transistor Q2 increases, the collector current of the transistor Q2 increases. Accordingly, the base current of the transistor Q1 increases, and thus the collector-emitter voltage of the transistor Q1 decreases. Thus, the larger the amplified error signal, the higher the output voltage Vo.

The reference voltage Vref is so determined that, when the divided voltage Vadj is equal to the reference voltage Vref, the output voltage Vo is equal to the desired output voltage Vo*. Thus, feedback control is performed in such a way that the output voltage Vo is kept equal to the desired output voltage Vo*. The capacitor Co serves as an output phase compensating capacitor that stabilizes the output voltage Vo.

However, the stabilized direct-current power supply device configured as described above suffers from a problem ascribable to a large current that flows instantaneously at start-up. This problem will be described in detail below with reference to FIGS. 5 and 6A to 6D. FIGS. 6A to 6D are time charts of the voltages and current observed at relevant points in the stabilized direct-current power supply device of FIG. 5 when it is operated without a load (with the load RL removed).

When the input voltage Vin starts being supplied to the input terminal 1, as shown in FIG. 6A, the input voltage Vin rises. At the same time that the input voltage Vin rises, as shown in FIG. 6B, the reference voltage Vref rises. Here, it is assumed that the voltage Vc (not shown in FIGS. 6A to 6D) also rises in synchronism with the input voltage Vin. At this time, as the charge current Ico of the capacitor Co, a current close to the limit of the current capacity of the transistor Q1 flows instantaneously as shown in FIG. 6D. Thereafter, when the capacitor Co is completely charged, and the output voltage Vo completely rises as shown in FIG. 6C, the output current Io drops to almost zero. Accordingly, the output voltage Vo-to-output current Io characteristic of the stabilized direct-current power supply device of FIG. 5 is as shown in FIG. 7.

Since the stabilized direct-current power supply device of FIG. 5 has an output voltage Vo-to-output current Io characteristic as shown in FIG. 7, even if the current $I_L$ that flows through the load RL in actual operation is small, a peak current Iop flows instantaneously at start-up. For this reason, unless the supply power source that supplies electric power to the stabilized direct-current power supply device has a sufficiently high capacity to permit the peak current Iop to flow, the output voltage of the supply power source drops at the start-up of the stabilized direct-current power supply device, and may cause malfunctioning of other systems connected in parallel with the stabilized direct-current power supply device. This requires the supply power source to have a considerably higher capacity than needed in actual operation, and thus makes the supply power source expensive.

To avoid this, a stabilized direct-current power supply device has been proposed that is provided with a means for reducing the output current Io at start-up. FIG. 8 shows an example of the configuration of a conventional stabilized direct-current power supply device of this type. In FIG. 8, such circuit elements as are found also in FIG. 5 are identified with the same reference numerals and symbols, and their explanations will not be repeated.

The stabilized direct-current power supply device of FIG. 8 is obtained by providing the stabilized direct-current power supply device of FIG. 5 additionally with a time constant circuit 11. The time constant circuit 11 is composed of a resistor R8, a terminal 10, and a capacitor C2, and is provided between the reference voltage circuit 5 and the error amplifier 4. The resistor R8 and the terminal 10 are integrated into the semiconductor integrated circuit device, and the capacitor C2 is provided outside it. One end of the resistor R8 is connected to the output end of the reference voltage circuit 5, and the other end of the resistor R8 is connected to the non-inverting input terminal of the error amplifier 4 and to the terminal 10. The terminal 10 is grounded through the capacitor C2.

Next, the operation of the stabilized direct-current power supply device of FIG. 8 will be described with reference to FIGS. 8 and 9A to 9D. FIGS. 9A to 9D are time charts of the voltages and current observed at relevant points in the stabilized direct-current power supply device of FIG. 8 when it is operated without a load (with the load RL removed). For comparison, in FIGS. 9A to 9D, the voltages and current observed at the corresponding points in the stabilized direct-current power supply device of FIG. 5 are shown with broken lines.

When the input voltage Vin starts being supplied to the input terminal 1, as shown in FIG. 9A, the input voltage Vin rises. At the same time that the input voltage Vin rises, as shown in FIG. 9B, the reference voltage Vref rises, but more gently owing to the time constant circuit 11. Here, it is assumed that the voltage Vc (not shown in FIGS. 9A to 9D) also rises in synchronism with the input voltage Vin.

Since the reference voltage Vref rises gently, the capacitor Co is charged gently. Accordingly, as shown in FIG. 9C, the output voltage Vo rises gently, with a lower peak in the output current as shown in FIG. 9D. Thereafter, when the capacitor Co is completely charged, and the output voltage Vo completely rises, the output current Io drops to almost zero. Accordingly, the output voltage Vo-to-output current Io characteristic of the stabilized direct-current power supply device of FIG. 8 is as shown in FIG. 10. For comparison, in FIG. 10, the output voltage Vo-to-output current Io characteristic of the stabilized direct-current power supply device of FIG. 5 is shown with a broken line.

As described above, with the stabilized direct-current power supply device of FIG. 8, soft starting is possible when the input voltage Vin starts being supplied thereto. However, in a case where the operation of the stabilized direct-current power supply device is turned on and off by turning on and off the application of the voltage Vc to the control terminal 6 with the input voltage Vin and the reference voltage Vref both already risen, it is not possible to perform soft starting by exploiting the rise in the reference voltage Vref As a result, quite disadvantageously, when the application of the voltage Vc to the control terminal 6 is switched from off to on, the output current Io instantaneously becomes close to the peak current Iop.

SUMMARY OF THE INVENTION

An object of the present invention is to provide a stabilized direct-current power supply device that can be soft-started even when the reference voltage has already risen.

To achieve the above object, according to the present invention, a stabilized direct-current power supply device is provided with: a voltage conversion circuit for converting an input voltage into an output voltage to be fed out; a detection circuit for detecting the output voltage; a reference voltage circuit for generating a reference voltage; an error amplifier for comparing the detection voltage output from the detection circuit with the reference voltage and amplifying the difference therebetween; a control circuit for controlling the voltage conversion circuit according to the output signal of the error amplifier so as to keep the detection voltage equal to the reference voltage; and a current suppression circuit for suppressing the current output from the voltage conversion circuit when the output voltage rises.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
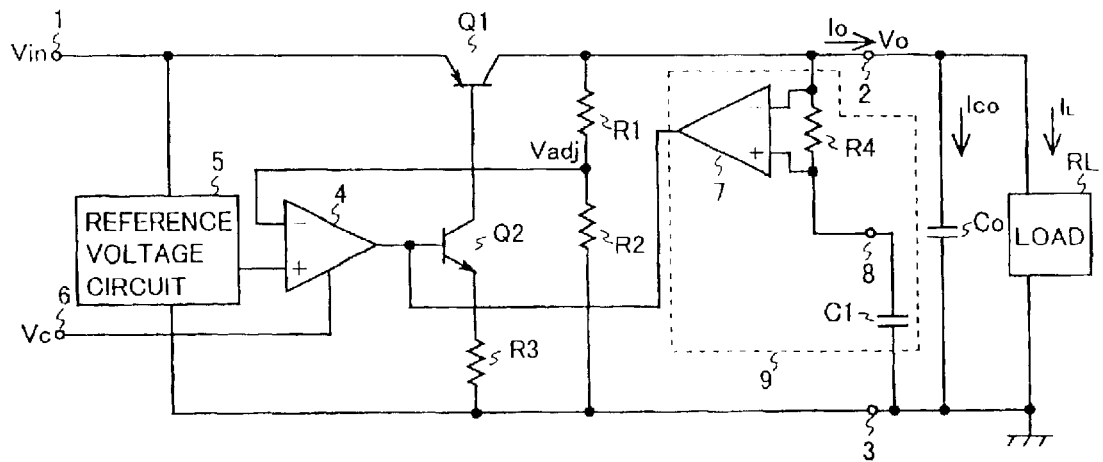
FIG. 1 is a diagram showing the configuration of the stabilized direct-current power supply device of a first embodiment of the invention.

Hereinafter, embodiments of the present invention will be described with reference to the drawings. FIG. 1 shows the configuration of the stabilized direct-current power supply device of a first embodiment of the invention. It is to be noted that, in FIG. 1, such circuit elements as are found also in FIG. 5 are identified with the same reference numerals and symbols, and their explanations will not be repeated.

Figure 5:
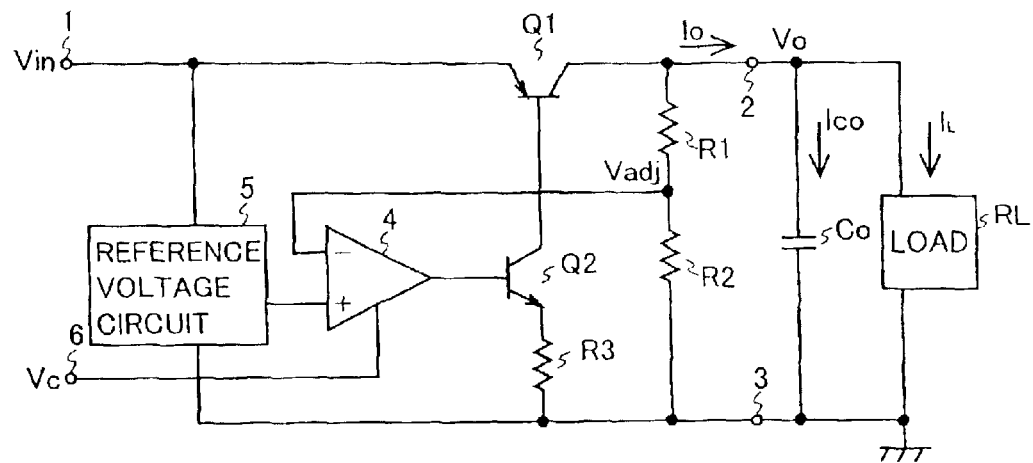
FIG. 5 is a diagram showing an example of a conventional direct-current power supply device.
Figure 6A:
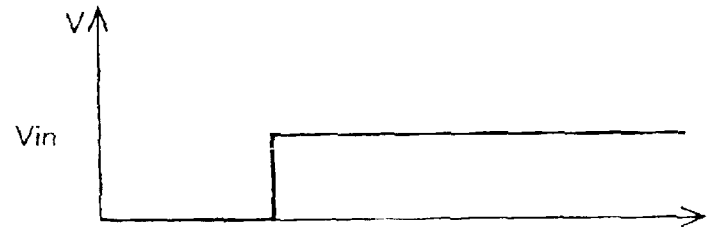
FIGS. 6A to 6D are time charts of the voltages and current observed at relevant points in the stabilized direct-current power supply device of FIG. 5 when it is started up.
Figure 6B:
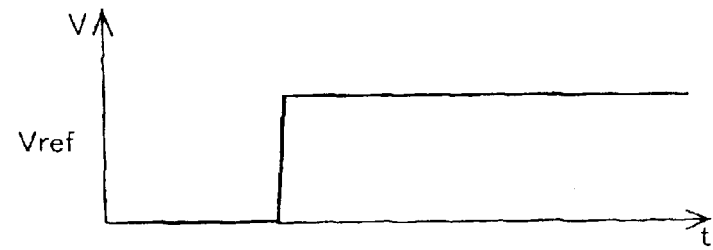
Figure 6C:
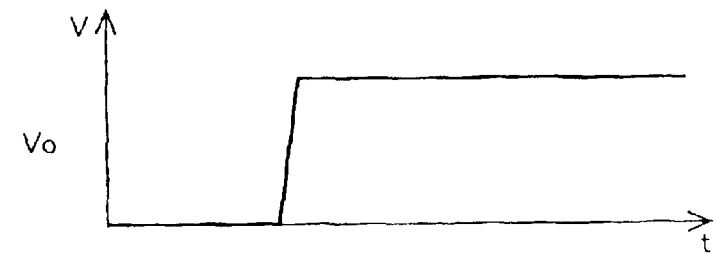
Figure 6D:
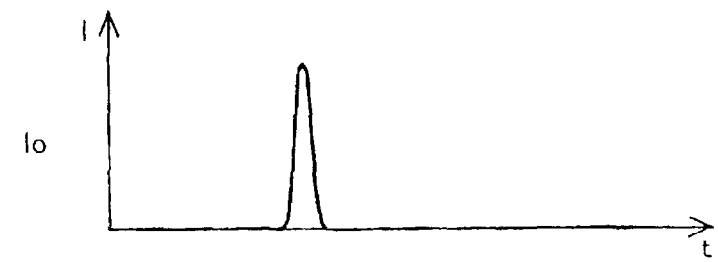
Figure 7:
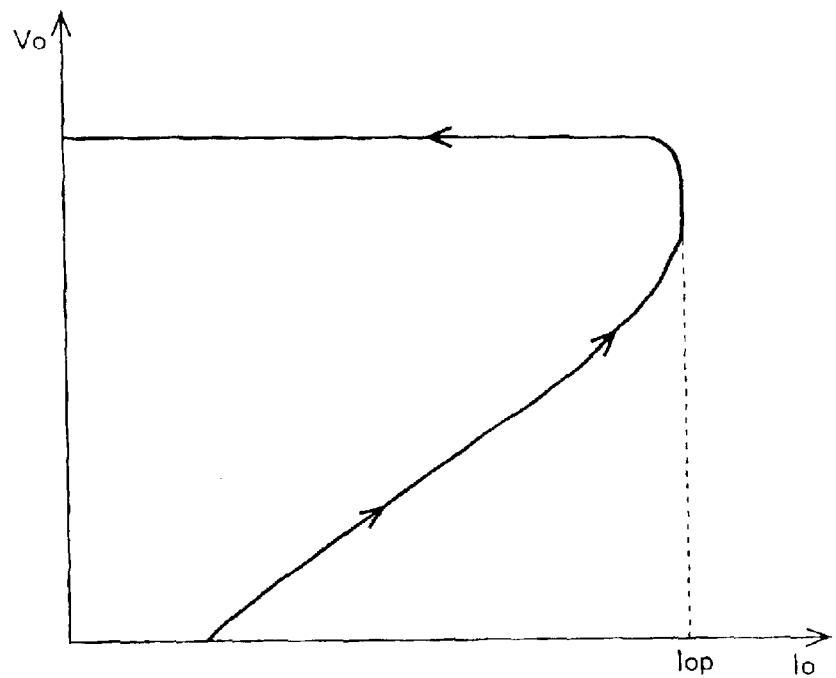
FIG. 7 is a diagram showing the output characteristic of the stabilized direct-current power supply device of FIG. 5.
Figure 8:
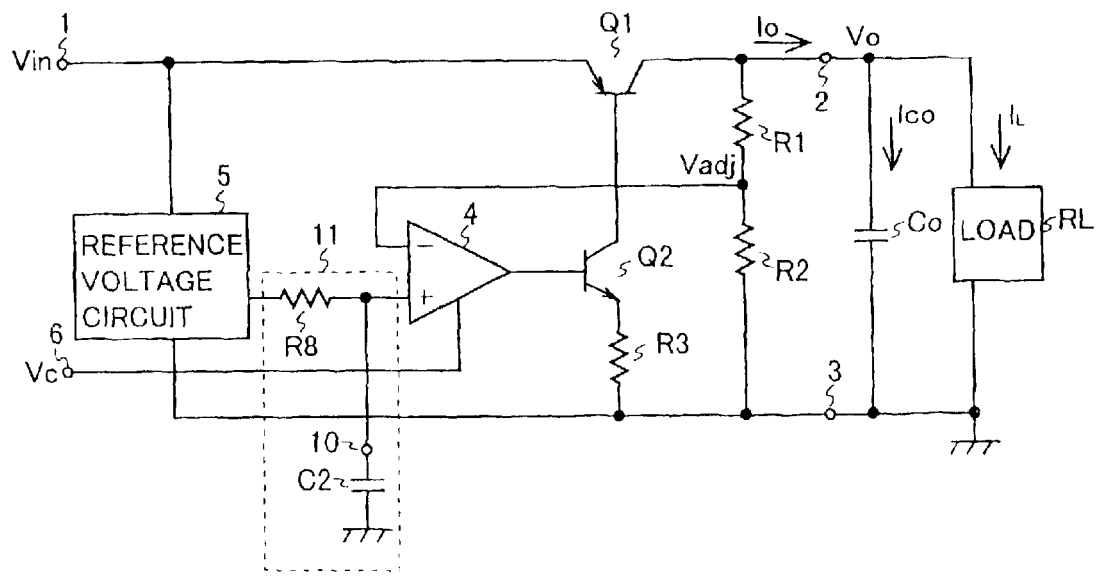
FIG. 8 is a diagram showing an example of a conventional direct-current power supply device with a soft starting function.
Figure 9A:
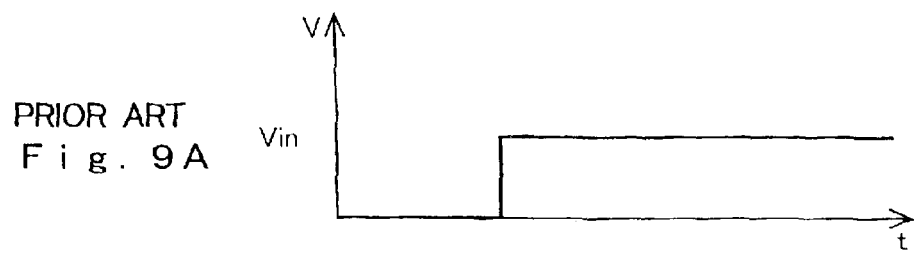
FIGS. 9A to 9D are time charts of the voltages and current observed at relevant points in the stabilized direct-current power supply device of FIG. 8 when it is started up.
Figure 9B:
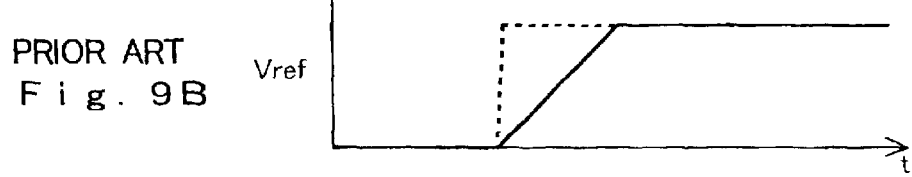
Figure 9C:
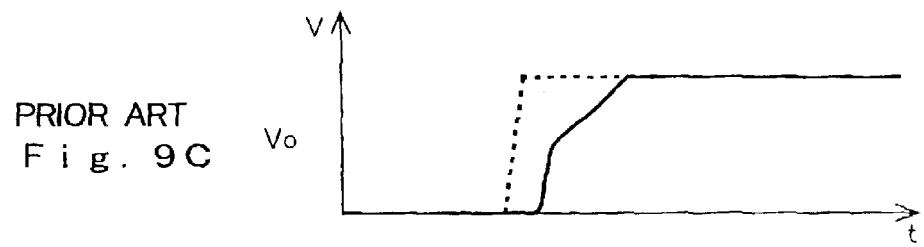
Figure 9D:
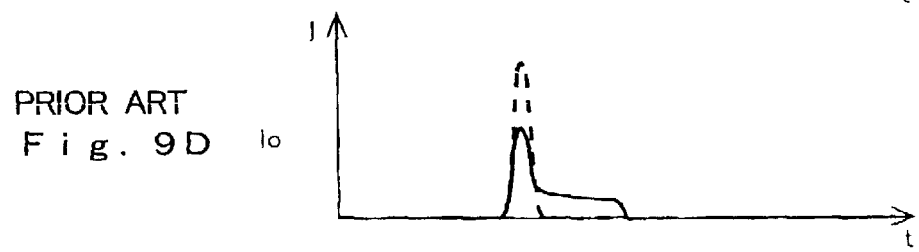
Figure 10:
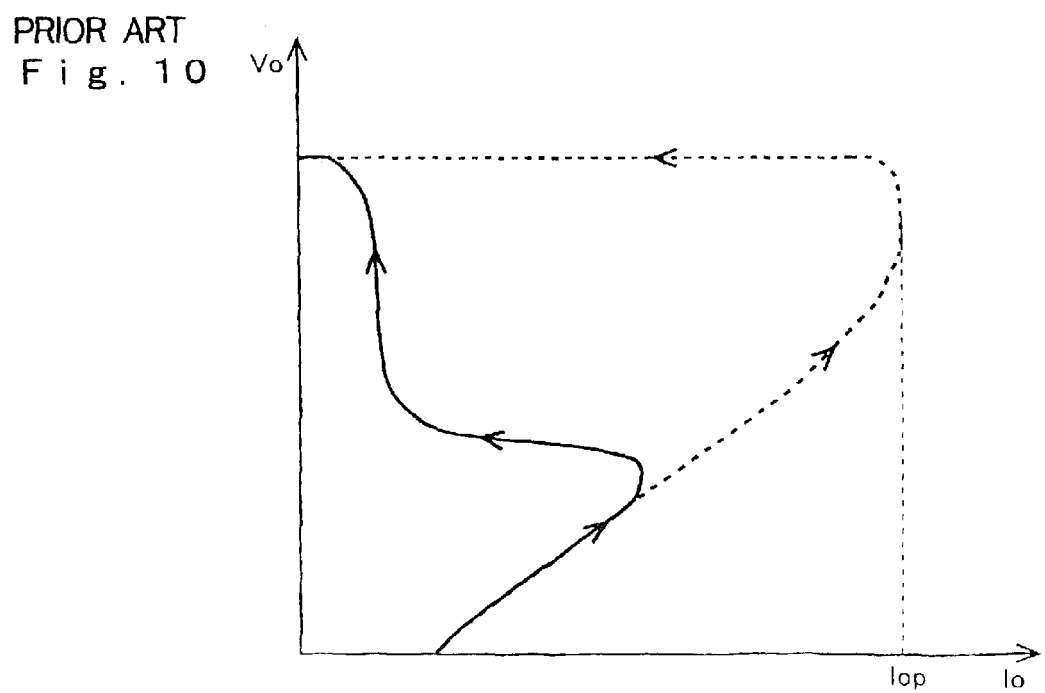
FIG. 10 is a diagram showing the output characteristic of the stabilized direct-current power supply device of FIG. 8.

The stabilized direct-current power supply device of the first embodiment shown in FIG. 1 is obtained by providing the stabilized direct-current power supply device of FIG. 5 additionally with an output current suppression circuit 9 that suppresses the output current Io when the output voltage Vo rises. The output current suppression circuit 9 is composed of a resistor R4, a comparator 7, a terminal 8, and a capacitor C1. Of these circuit elements, the resistor R4, comparator 7, and terminal 8 are integrated into the semiconductor integrated circuit device, and the capacitor C1 is provided outside it.

One end of the resistor R4 is connected to the output terminal 2, and the other end of the resistor R4 is connected via the terminal 8 to one end of the capacitor C1. The other end of the capacitor C1 is connected to the ground terminal 3. The inverting input terminal of the comparator 7 is connected to one end of the resistor R4, the non-inverting input terminal of the comparator 7 is connected to the other end of the resistor R4, and the output terminal of the comparator 7 is connected to the base of the transistor Q2.

Next, how the stabilized direct-current power supply device of FIG. 1 operates when the output voltage Vo rises will be described with reference to FIGS. 1 and 2A to 2D. FIGS. 2A to 2D are time charts of the voltages and current observed at relevant points in the stabilized direct-current power supply device of FIG. 1 when it is operated without a load (i.e. with the load RL removed). For comparison, in FIGS. 2A to 2D, the voltages and current observed at the corresponding points in the stabilized direct-current power supply device of FIG. 5 are shown with broken lines.

Figure 2A:
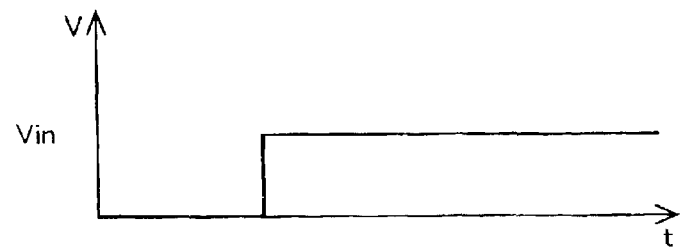
FIGS. 2A to 2D are time charts of the voltages and current observed at relevant points in the stabilized direct-current power supply device of FIG. 1 when it is started up.
Figure 2B:
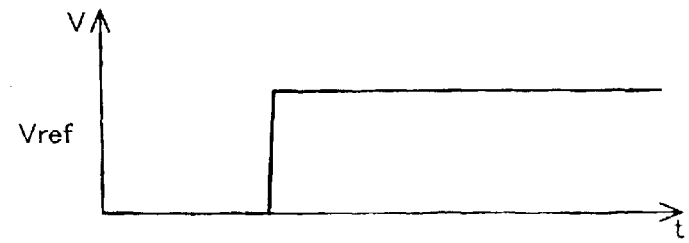

When the input voltage Vin starts being supplied to the input terminal 1, as shown in FIG. 2A, the input voltage Vin rises. At the same time that the input voltage Vin rises, as shown in FIG. 2B the reference voltage Vref rises. Here, it is assumed that the voltage Vc (not shown) also rises in synchronism with the input voltage Vin. However, at the moment when the input voltage Vin rises, the output voltage Vo is approximately equal to 0 [V], and therefore the amplified error signal output from the error amplifier 4 is at its maximum.

On the other hand, when the output voltage Vo rises, the capacitor C1 is charged through the resistor R4. Thus, through the resistor R4 flows a current that is commensurate with the speed at which the output voltage Vo rises. According to the voltage produced across the resistor R4 by this current, the comparator 7 outputs a low-level voltage signal, which is fed to the base of the transistor Q2.

Figure 2C:
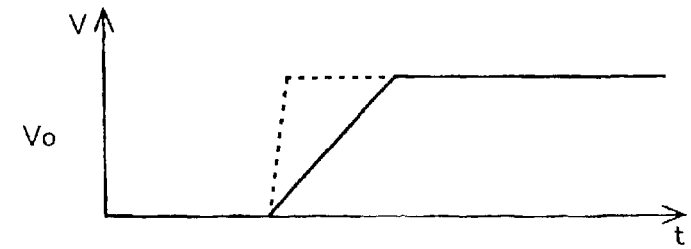
Figure 2D:
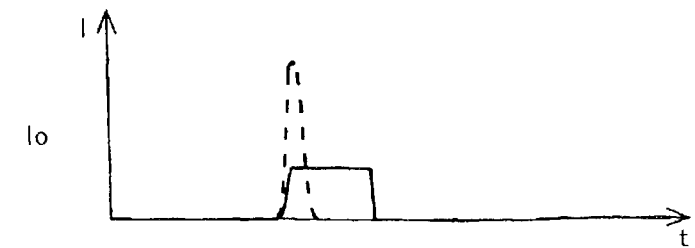

The base voltage of the transistor Q2 has the same level as the voltage signal output from the comparator 7 irrespective of the magnitude of the amplified error signal output from the error amplifier 4. Thus, as shown in FIG. 2C, the output voltage Vo rises gently, with a lower peak in the output current Io as shown in FIG. 2D. In this way, the current suppression circuit 9 detects the speed at which the output voltage Vo rises, and operates according to the speed at which the output voltage Vo rises. Thus, the current suppression circuit 9 can detect the rise in the output voltage Vo and control the output current Io when the output voltage Vo rises. Moreover, the current suppression circuit 9 varies the degree to which it suppresses the output current Io according to the speed at which the output voltage Vo rises. This helps reduce the time required for the output voltage Vo to rise as compared with a case where the degree to which the output current Io is suppressed is constant.

Then, the capacitor Co is completely charged, and the output voltage Vo completely rises. In this embodiment, the capacitance of the capacitor C1 is so determined that, at approximately the same time that the capacitor Co is completely charged, the capacitor C1 is completely charged. When the capacitor C1 is completely charged, no current flows through the resistor R4 any longer, making the voltage across it approximately equal to 0 [V]. The comparator 7 is provided with a switch that is turned on in response to a low-level signal and off in response to a high-level signal so that the output of the comparator 7 is turned on and off by that switch. Accordingly, when the voltage fed to the inverting input terminal is equal to the voltage fed to the non-inverting input terminal, i.e., when the voltage fed to the inverting input terminal is not lower than the voltage fed to the non-inverting input terminal, the comparator 7 stops yielding any output. Thus, after the output voltage Vo has risen, the stabilized direct-current power supply device of this embodiment operates in the same manner as that of FIG. 5, with almost no output current Io flowing.

Figure 3:
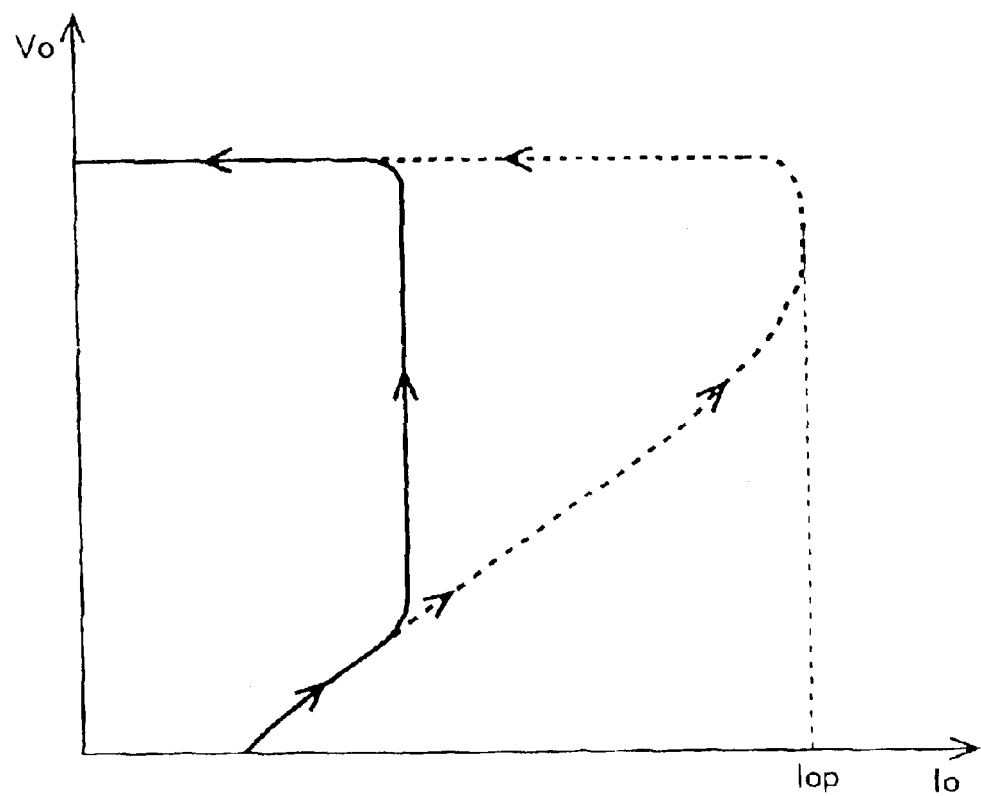
FIG. 3 is a diagram showing the output characteristic of the stabilized direct-current power supply device of FIG. 1.

Accordingly, the stabilized direct-current power supply device of FIG. 1 exhibits an output voltage Vo-to-output current Io characteristic as shown in FIG. 3. For comparison, in FIG. 3, the output voltage Vo-to-output current Io characteristic of the stabilized direct-current power supply device of FIG. 5 is shown with a broken line.

The stabilized direct-current power supply device of this embodiment, by operating in the manner described above, permits soft starting without fail whenever the output voltage Vo rises; that is, it permits soft starting even when the reference voltage Vref has already risen.

Moreover, after the output voltage Vo has risen, even if the output voltage Vo drops as a result of an abrupt variation in the load RL, the voltage at the terminal 8 does not fluctuate, and thus the comparator 7 yields no output. This prevents the output current suppression circuit 9 from operating erroneously except when the output voltage Vo rises.

Moreover, since the capacitor C1 is provided outside the semiconductor integrated circuit device, it can be given a high capacitance. In addition, by varying the capacitance of the capacitor C1, it is possible to adjust the output current Io that flows when the output voltage Vo rises and the time required for the output voltage Vo to rise.

Furthermore, the terminal 8 can be used as a terminal from which a stabilized voltage is obtained. In this case, the resistor R4 and the capacitor C1 function as a RC filter circuit, and therefore the voltage fed out via the terminal 8 is more stable than the output voltage Vo fed out via the output terminal 2. The output via the terminal 8, however, needs to be limited to a small current so that the output current suppression circuit 9 does not suppress the output current Io except when the output voltage Vo rises.

In this embodiment, the voltage across the resistor R4 is used to detect the speed at which the output voltage rises. However, instead of the resistor R4, it is also possible to use any other type of resistive element, such as a transistor or diode. By providing a resistive element, such as a diode, in series with the resistor R4 and the capacitor C1, it is possible to change the level at which the rising speed of the output voltage Vo is detected in the resistor R4.

Figure 4:
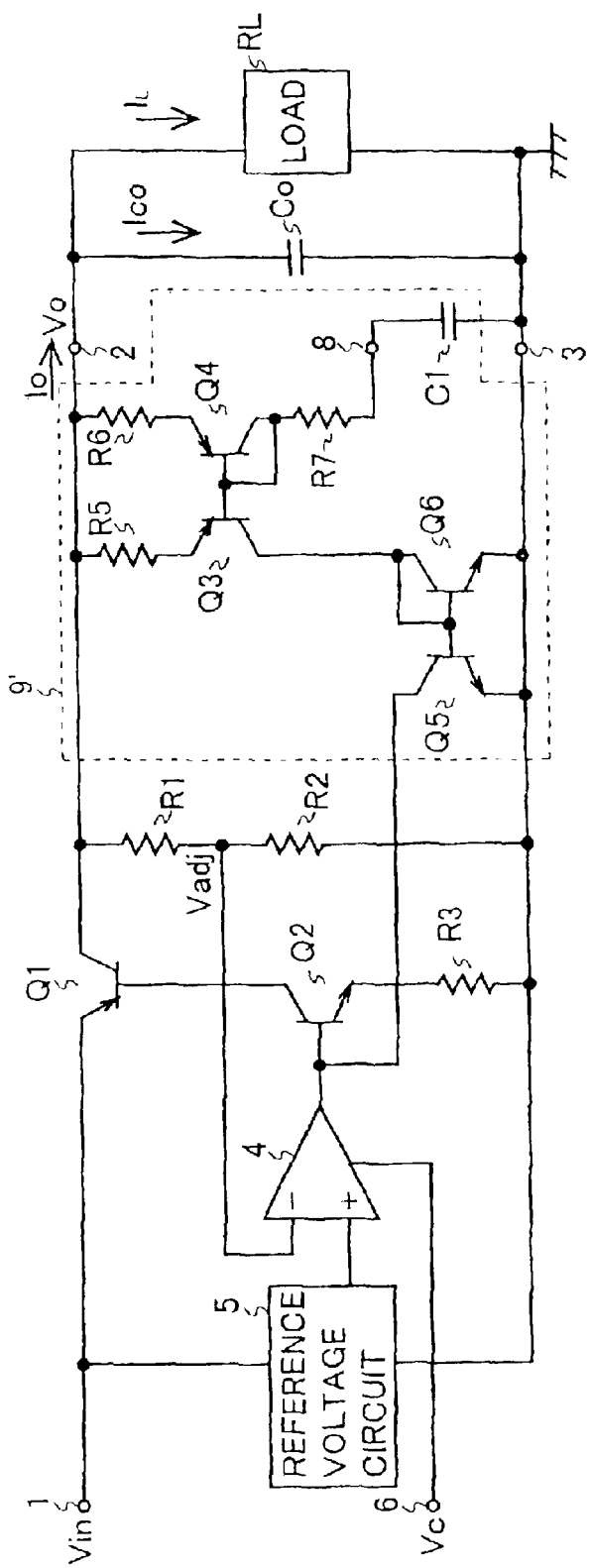
FIG. 4 is a diagram showing the configuration of the stabilized direct-current power supply device of a second embodiment of the invention.

Next, the stabilized direct-current power supply device of a second embodiment of the invention will be described. FIG. 4 shows the configuration of the stabilized direct-current power supply device of the second embodiment of the invention. It is to be noted that, in FIG. 4, such circuit elements as are found also in FIG. 1 are identified with the same reference numerals and symbols, and their explanations will not be repeated.

The stabilized direct-current power supply device of the second embodiment shown in FIG. 4 differs from the stabilized direct-current power supply device of FIG. 1 in that the output current suppression circuit 9 of the latter is replaced with an output current suppression circuit 9'. The output current suppression circuit 9' is composed of resistors R5 to R7, PNP-type transistors Q3 and Q4, NPN-type transistors Q5 and Q6, a terminal 8, and a capacitor C1. Of these circuit elements, the resistors R5 to R7, PNP-type transistors Q3 and Q4, NPN-type transistors Q5 and Q6, and terminal 8 are integrated into the semiconductor integrated circuit device, and the capacitor C1 is provided outside it.

The emitter of the transistor Q3 is connected through the resistor R5 to the output terminal 2, and the emitter of the transistor Q4 is connected through the resistor R6 to the output terminal 2. The bases of the transistors Q3 and Q4 are connected together. The collector of the transistor Q3 is connected to the collector of the transistor Q6, and the collector of the transistor Q4 is connected through the resistor R7 to the terminal 8. The base and collector of the transistor Q4 are connected together. In this configuration, the transistors Q3 and Q4 form a current mirror circuit.

The collector of the transistor Q5 is connected to the base of the transistor Q2. The bases of the transistors Q5 and Q6 are connected together. The emitters of the transistors Q5 and Q6 are both connected to the ground terminal 3. The base and collector of the transistor Q6 are connected together. In this configuration, the transistors Q5 and Q6 form a current mirror circuit.

When the output voltage Vo rises, a charge current flows through the capacitor C1 by way of the transistor Q4. As described above, the transistors Q3 and Q4 form a current mirror circuit, the transistors Q5 and Q6 form a current mirror circuit, and the collectors of the transistors Q3 and Q6 are connected together. Accordingly, a current equal to the charge current of the capacitor C1 flows through the transistor Q5. Thus, the output current suppression circuit 9' extracts from the base of the transistor Q2 a current equal to the charge current of the capacitor C1.

With the output current suppression circuit 9' operating in the manner described above, when the stabilized direct-current power supply device of the second embodiment is operated without a load (i.e., with the load RL removed), the voltages and current observed at relevant points therein behave in the same manner as in the stabilized direct-current power supply device of the first embodiment (see FIGS. 2A to 2D). Accordingly, the stabilized direct-current power supply device of the second embodiment exhibits the same output voltage Vo-to-output current Io characteristic as the stabilized direct-current power supply device of the first embodiment (see FIG. 3).

In the stabilized direct-current power supply devices of the first and second embodiments described above, the capacitor C1 is provided between the terminal 8 and the ground terminal 3. It is, however, also possible to provide the capacitor C1 between the terminal 8 and the output terminal 2 and provide the resistor R4 or the current mirror circuit between the terminal 8 and the ground terminal 3. These configurations offer the same advantages.

What is claimed is:

1. A stabilized direct-current power supply device comprising:
   a voltage conversion circuit for converting an input voltage into an output voltage to be fed out;
   a detection circuit for detecting the output voltage;
   a reference voltage circuit for generating a reference voltage;
   an error amplifier for comparing a detection voltage output from the detection circuit with the reference voltage and amplifying a difference therebetween;
   a control circuit for controlling the voltage conversion circuit according to an output signal of the error amplifier so as to keep the detection voltage equal to the reference voltage; and
   a current suppression circuit for suppressing a current output from the voltage conversion circuit when the output voltage rises irrespective of whether the reference voltage has already risen or not.

2. A stabilized direct-current power supply device, comprising:
   a voltage conversion circuit for converting an input voltage into an output voltage to be fed out;
   a detection circuit for detecting the output voltage;
   a reference voltage circuit for generating a reference voltage;
   an error amplifier for comparing a detection voltage output from the detection circuit with the reference voltage and amplifying a difference therebetween;
   a control circuit for controlling the voltage conversion circuit according to an output signal of the error amplifier so as to keep the detection voltage equal to the reference voltage; and
   a current suppression circuit for suppressing a current output from the voltage conversion circuit when the output voltage rises,
   wherein the current suppression circuit detects a speed at which the output voltage rises, and operates according to the speed at which the output voltage rises.

3. A stabilized direct-current power supply device as claimed in claim 2,
   wherein the current suppression circuit varies a degree to which it suppresses the current according to the speed at which the output voltage rises.

4. A stabilized direct-current power supply device as claimed in claim 2, further comprising:
   an output terminal to which the output voltage is applied; and
   a ground terminal that is kept at a ground potential,
   wherein the current suppression circuit includes a serial circuit consisting of a resistance and a capacitance, the serial circuit being connected between the output terminal and the ground terminal so that a voltage across the resistance is used to detect the speed at which the output voltage rises.

5. A stabilized direct-current power supply device as claimed in claim 4, further comprising:
   an extra terminal provided between the resistance and the capacitance,
   wherein a whole circuit of the stabilized direct-current power supply device except for the capacitance is integrated into a semiconductor integrated circuit device, and the capacitance is provided outside the semiconductor integrated circuit device.

6. A stabilized direct-current power supply device as claimed in claim 5,
   wherein a voltage applied to the extra terminal is used as a second output voltage.

7. A stabilized direct-current power supply device as claimed in claim 2, further comprising:
   an output terminal to which the output voltage is applied; and
   a ground terminal that is kept at a ground potential,
   wherein the current suppression circuit includes a capacitance provided between the output terminal and the ground terminal and a current mirror circuit for detecting a current flowing through the capacitance so that an output current from the current mirror circuit is used to detect the speed at which the output voltage rises.

8. A stabilized direct-current power supply device as claimed in claim 7, further comprising:
   an extra terminal provided between the current mirror circuit and the capacitance,
   wherein a whole circuit of the stabilized direct-current power supply device except for the capacitance is integrated into a semiconductor integrated circuit device, and the capacitance is provided outside the semiconductor integrated circuit device.

9. A stabilized direct-current power supply device as claimed in claim 8, wherein a voltage applied to the extra terminal is used as a second output voltage.

10. A stabilized direct-current power supply device as claimed in claim 3, further comprising:

an output terminal to which the output voltage is applied; and a ground terminal that is kept at a ground potential, wherein the current suppression circuit includes a serial circuit consisting of a resistance and a capacitance, the serial circuit being connected between the output terminal and the ground terminal so that a voltage across the resistance is used to detect the speed at which the output voltage rises.

11. A stabilized direct-current power supply device as claimed in claim 10, further comprising:

an extra terminal provided between the resistance and the capacitance, wherein a whole circuit of the stabilized direct-current power supply device except for the capacitance is integrated into a semiconductor integrated circuit device, and the capacitance is provided outside the semiconductor integrated circuit device.

12. A stabilized direct-current power supply device as claimed in claim 11, wherein a voltage applied to the extra terminal is used as a second output voltage.

13. A stabilized direct-current power supply device as claimed in claim 3, further comprising:

an output terminal to which the output voltage is applied; and a ground terminal that is kept at a ground potential, wherein the current suppression circuit includes a capacitance provided between the output terminal and the ground terminal and a current mirror circuit for detecting a current flowing through the capacitance so that an output current from the current mirror circuit is used to detect the speed at which the output voltage rises.

14. A stabilized direct-current power supply device as claimed in claim 13, further comprising:

an extra terminal provided between the current mirror circuit and the capacitance, wherein a whole circuit of the stabilized direct-current power supply device except for the capacitance is integrated into a semiconductor integrated circuit device, and the capacitance is provided outside the semiconductor integrated circuit device.

15. A stabilized direct-current power supply device as claimed in claim 14, wherein a voltage applied to the extra terminal is used as a second output voltage.

\* \* \* \* \*